(12) United States Patent
Kimes

(10) Patent No.: US 10,590,999 B2
(45) Date of Patent: Mar. 17, 2020

(54) OVERRUNNING, NON-FRICTION, RADIAL COUPLING AND CONTROL ASSEMBLY AND SWITCHABLE LINEAR ACTUATOR DEVICE FOR USE IN THE ASSEMBLY

(71) Applicant: Means Industries, Inc., Saginaw, MI (US)

(72) Inventor: John W. Kimes, Wayne, MI (US)

(73) Assignee: Means Industries, Inc., Saginaw, MI (US)

( * ) Notice: Subject to any disclaimer, the term of this patent is extended or adjusted under 35 U.S.C. 154(b) by 200 days.

(21) Appl. No.: 15/890,415

(22) Filed: Feb. 7, 2018

(65) Prior Publication Data

US 2018/0347642 A1    Dec. 6, 2018

Related U.S. Application Data

(60) Provisional application No. 62/513,567, filed on Jun. 1, 2017.

(51) Int. Cl.
*F16D 27/108* (2006.01)
*F16D 41/16* (2006.01)
(Continued)

(52) U.S. Cl.
CPC .......... *F16D 27/108* (2013.01); *F16D 21/04* (2013.01); *F16D 41/16* (2013.01); *F16D 27/004* (2013.01);
(Continued)

(58) Field of Classification Search
CPC .......... F16D 41/12; F16D 41/14; F16D 41/16; F16D 27/10–118; F16D 21/04
See application file for complete search history.

(56) References Cited

U.S. PATENT DOCUMENTS 4,050,560 A    9/1977 Torstenfelt
4,340,133 A    7/1982 Blersch
(Continued)

OTHER PUBLICATIONS

International Searching Authority, International Search Report for International Application No. PCT/US2018/33591 dated Aug. 13, 2018.

*Primary Examiner* — David R Morris
*Assistant Examiner* — James J Taylor, II
(74) *Attorney, Agent, or Firm* — Brooks Kushman P.C.

(57) ABSTRACT

A switchable linear actuator device and an overrunning, non-friction, radial coupling and control assembly using the device are provided. The device has magnetic sources which produce corresponding magnetic fields to create net translational forces. The device includes a first and locking members and a stator structure including a first and second electromagnetic sources configured to create first and second electronically-switched magnetic fields, respectively. A translator structure includes first and second cams having contour surfaces and a magnetically-latching, permanent magnetic source magnetically coupled to the stator structure across a radial air gap. The translator structure translates along an axis between first and second axial positions and between second and third axial positions upon experiencing first and second net translational forces, respectively, to cause the first and second locking members to ride on the contour surfaces of the first and second cams, respectively, and perform a sequenced shift.

20 Claims, 9 Drawing Sheets

(51) Int. Cl.
*F16D 21/04* (2006.01)
*F16D 27/102* (2006.01)
*F16D 27/00* (2006.01)
*H02K 41/03* (2006.01)
*F16D 41/14* (2006.01)

(52) U.S. Cl.
CPC .......... *F16D 27/102* (2013.01); *F16D 41/14* (2013.01); *H02K 41/031* (2013.01)

(56) References Cited

U.S. PATENT DOCUMENTS

| | | | |
|---|---|---|---|
| 5,052,534 A | 10/1991 | Gustin et al. | |
| 5,070,978 A | 12/1991 | Pires | |
| 5,206,573 A | 4/1993 | McCleer et al. | |
| 5,231,265 A | 7/1993 | Hackett et al. | |
| 5,342,258 A | 8/1994 | Egyed | |
| 5,362,293 A | 11/1994 | Romanauskas | |
| 5,387,854 A | 2/1995 | McCleer et al. | |
| 5,394,321 A | 2/1995 | McCleer et al. | |
| 5,453,598 A | 9/1995 | Hackett et al. | |
| 5,597,057 A | 1/1997 | Ruth et al. | |
| 5,638,929 A | 6/1997 | Park | |
| 5,642,009 A | 6/1997 | McCleer et al. | |
| 5,678,668 A | 10/1997 | Sink | |
| 5,802,915 A * | 9/1998 | Organek | F16D 21/04 74/331 |
| 5,846,257 A | 12/1998 | Hood | |
| 5,918,715 A | 7/1999 | Ruth et al. | |
| 5,924,510 A | 7/1999 | Itoh et al. | |
| 5,927,455 A | 7/1999 | Baker et al. | |
| 6,065,576 A | 5/2000 | Shaw et al. | |
| 6,075,302 A | 6/2000 | McCleer | |
| 6,193,038 B1 | 2/2001 | Scott et al. | |
| 6,244,965 B1 | 6/2001 | Klecker et al. | |
| 6,290,044 B1 | 9/2001 | Burgman et al. | |
| 6,328,670 B1 | 12/2001 | Minowa et al. | |
| 6,503,167 B1 | 1/2003 | Sturm | |
| 6,692,405 B2 | 2/2004 | Minowa et al. | |
| 6,814,201 B2 | 11/2004 | Thomas | |
| 6,846,257 B2 | 1/2005 | Baker et al. | |
| 6,953,409 B2 | 10/2005 | Schmidt et al. | |
| 6,982,502 B1 | 1/2006 | Sendaula et al. | |
| 7,093,512 B2 | 8/2006 | Ibamoto et al. | |
| 7,153,228 B2 | 12/2006 | Fujiu et al. | |
| 7,198,587 B2 | 4/2007 | Samie et al. | |
| 7,223,198 B2 | 5/2007 | Kimes et al. | |
| 7,256,510 B2 | 8/2007 | Holmes et al. | |
| 7,258,214 B2 | 8/2007 | Pawley et al. | |
| 7,275,628 B2 | 10/2007 | Pawley et al. | |
| 7,344,010 B2 | 3/2008 | Fetting, Jr. et al. | |
| 7,464,801 B2 | 12/2008 | Wittkopp | |
| 7,484,605 B2 | 2/2009 | Pawley et al. | |
| 7,491,151 B2 | 2/2009 | Maguire et al. | |
| 7,690,455 B2 | 4/2010 | Kano et al. | |
| 7,695,387 B2 | 4/2010 | Oba | |
| 7,743,678 B2 * | 6/2010 | Wittkopp | F16D 41/16 192/43.1 |
| 7,806,795 B2 | 10/2010 | Oba et al. | |
| 7,898,121 B2 * | 3/2011 | Ramsay | H02K 41/031 310/101 |
| 7,942,781 B2 | 5/2011 | Kimes | |
| 8,491,439 B2 | 7/2013 | Kimes | |
| 8,813,929 B2 | 8/2014 | Kimes | |
| 8,888,637 B2 | 11/2014 | Kimes | |
| 9,109,636 B2 | 8/2015 | Kimes et al. | |
| 9,186,977 B2 | 11/2015 | Kimes | |
| 9,188,172 B2 | 11/2015 | Fetting et al. | |
| 9,303,699 B2 | 4/2016 | Kimes et al. | |
| 9,435,387 B2 | 9/2016 | Kimes et al. | |
| 9,441,708 B2 | 9/2016 | Kimes et al. | |
| 2003/0102196 A1 | 6/2003 | Wetzel et al. | |
| 2004/0110594 A1 | 6/2004 | Goto | |
| 2006/0021836 A1 | 2/2006 | Kimes et al. | |
| 2006/0138777 A1 | 6/2006 | Hofbauer et al. | |
| 2006/0185957 A1 | 8/2006 | Kimes et al. | |
| 2006/0252589 A1 | 11/2006 | Tay | |
| 2006/0278487 A1 | 12/2006 | Pawley et al. | |
| 2007/0056825 A1 | 3/2007 | Fetting, Jr. et al. | |
| 2007/0278061 A1 | 12/2007 | Wittkopp et al. | |
| 2008/0110715 A1 | 5/2008 | Pawley | |
| 2008/0169165 A1 | 7/2008 | Samie et al. | |
| 2008/0169166 A1 | 7/2008 | Wittkopp et al. | |
| 2008/0185253 A1 | 8/2008 | Kimes | |
| 2008/0223681 A1 | 9/2008 | Stevenson et al. | |
| 2009/0084653 A1 | 4/2009 | Holmes | |
| 2009/0098968 A1 | 4/2009 | Maguire et al. | |
| 2009/0098970 A1 | 4/2009 | Kimes | |
| 2009/0127059 A1 | 5/2009 | Knoblauch | |
| 2009/0133981 A1 | 5/2009 | Tarasinski et al. | |
| 2009/0142207 A1 | 6/2009 | Ring et al. | |
| 2009/0159391 A1 | 6/2009 | Eisengruber | |
| 2009/0194381 A1 | 8/2009 | Samie et al. | |
| 2009/0211863 A1 | 8/2009 | Kimes | |
| 2009/0255773 A1 | 10/2009 | Seufert et al. | |
| 2010/0044141 A1 | 2/2010 | Kimes et al. | |
| 2010/0071497 A1 | 3/2010 | Reisch et al. | |
| 2010/0119389 A1 | 5/2010 | Lazebnik et al. | |
| 2010/0200358 A1 | 8/2010 | Eisengruber et al. | |
| 2010/0230226 A1 | 9/2010 | Prout | |
| 2010/0252384 A1 | 10/2010 | Eisengruber | |
| 2011/0140451 A1 | 6/2011 | Sharples et al. | |
| 2011/0177900 A1 | 7/2011 | Simon | |
| 2011/0215575 A1 | 9/2011 | Hofbauer et al. | |
| 2011/0233026 A1 | 9/2011 | Pawley | |
| 2012/0149518 A1 | 6/2012 | Kimes | |
| 2013/0256078 A1 | 10/2013 | Kimes et al. | |
| 2013/0277164 A1 | 10/2013 | Prout et al. | |
| 2014/0100071 A1 | 4/2014 | Kimes | |
| 2014/0291100 A1 | 10/2014 | Sharp | |
| 2015/0000442 A1 | 1/2015 | Kimes et al. | |
| 2015/0014116 A1 | 1/2015 | Kimes et al. | |
| 2015/0034448 A1 | 2/2015 | Ueda | |
| 2016/0290426 A1 | 10/2016 | Helmer et al. | |

* cited by examiner

OVERRUNNING, NON-FRICTION, RADIAL COUPLING AND CONTROL ASSEMBLY AND SWITCHABLE LINEAR ACTUATOR DEVICE FOR USE IN THE ASSEMBLY

CROSS-REFERENCE TO RELATED APPLICATIONS

This application claims the benefit of U.S. Provisional Application Ser. No. 62/513,567 filed Jun. 1, 2017.

TECHNICAL FIELD

This invention generally relates to overrunning, non-friction, radial coupling and control assemblies and switchable linear actuator devices for use in such assemblies.

Overview

A typical one-way clutch (OWC) consists of an inner ring, an outer ring and a locking device between the two rings. The one-way clutch is designed to lock in one direction and to allow free rotation in the other direction. Two types of one-way clutches often used in vehicular, automatic transmissions include:

Roller type which consists of spring loaded rollers between the inner and outer race of the one-way clutch. (Roller type is also used without springs on some applications); and Sprag type which consists of asymmetrically shaped wedges located between the inner and outer race of the one-way clutch.

The one-way clutches are typically used in the transmission to prevent an interruption of drive torque (i.e., power flow) during certain gear shifts and to allow engine braking during coasting.

Controllable or selectable one-way clutches (i.e., OWCs) are a departure from traditional one-way clutch designs. Selectable OWCs add a second set of locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or control mechanism. Movement of this selection mechanism can be between two or more positions which correspond to different operating modes.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission.

U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump and valves.

Other related U.S. patent publications include: 2011/0140451; 2011/0215575; 2011/0233026; 2011/0177900; 2010/0044141; 2010/0071497; 2010/0119389; 2010/0252384; 2009/0133981; 2009/0127059; 2009/0084653; 2009/0194381; 20009/0142207; 2009/0255773; 2009/0098968; 2010/0230226; 2010/0200358; 2009/0211863; 2009/0159391; 2009/0098970; 2008/0223681; 2008/0110715; 2008/0169166; 2008/0169165; 2008/0185253; 2007/0278061; 2007/0056825; 2006/0252589; 2006/0278487; 2006/0138777; 2006/0185957; 2004/0110594; and the following U.S. Pat. Nos. 7,942,781; 7,806,795; 7,695,387; 7,690,455; 7,491,151; 7,484,605; 7,464,801; 7,349,010; 7,275,628; 7,256,510; 7,223,198; 7,198,587; 7,093,512; 6,953,409; 6,846,257; 6,814,201; 6,503,167; 6,328,670; 6,692,405; 6,193,038; 4,050,560; 4,340,133; 5,597,057; 5,918,715; 5,638,929; 5,342,258; 5,362,293; 5,678,668; 5,070,978; 5,052,534; 5,387,854; 5,231,265; 5,394,321; 5,206,573; 5,453,598; 5,642,009; 6,075,302; 6,065,576; 6,982,502; 7,153,228; 5,846,257; 5,924,510; and 5,918,715.

A linear motor is an electric motor that has had its stator and rotor "unrolled" so that instead of producing a torque (rotation) it produces a linear force along its length. The most common mode of operation is as a Lorentz-type actuator, in which the applied force is linearly proportional to the current and the magnetic field. U.S. published application 2003/0102196 discloses a bi-directional linear motor.

Linear stepper motors are used for positioning applications requiring rapid acceleration and high speed moves with low mass payloads. Mechanical simplicity and precise open look operation are additional features of stepper linear motor systems.

A linear stepper motor operates on the same electromagnetic principles as a rotary stepper motor. The stationary part or platen is a passive toothed steel bar extending over the desired length of travel. Permanent magnets, electro-magnets with teeth, and bearings are incorporated into the moving elements or forcer. The forcer moves bi-directionally along the platen, assuring discrete locations in response to the state of the currents in the field windings. In general, the motor is two-phase, however a larger number of phases can be employed.

The linear stepper motor is well known in the prior art and operates upon established principles of magnetic theory. The stator or platen component of the linear stepper motor consists of an elongated, rectangular steel bar having a plurality of parallel teeth that extends over the distance to be traversed and functions in the manner of a track for the so-called forcer component of the motor.

The platen is entirely passive during operation of the motor and all magnets and electromagnets are incorporated into the forcer or armature component. The forcer moves bi-directionally along the platen assuming discrete locations in response to the state of the electrical current in its field windings.

U.S. patent documents assigned to the same assignee as the present application and which are related to the present application include U.S. Pat. Nos. 8,813,929; 8,888,637; 9,109,636, 9,186,977; 9,303,699; 9,435,387; 9,441,708 and U.S. published applications 2012/0149518; 2013/0256078; 2013/0277164; 2014/0100071; 2015/0000442 and 2015/0014116. The disclosures of all of the above-noted, commonly assigned patent documents are hereby incorporated in their entirety by reference herein.

Some of the above related patent documents assigned to the assignee of the present application disclose a 2-position, linear motor eCMD (electrically controllable mechanical diode). This device is a dynamic one-way clutch as both races (i.e. notch and pocket plates) rotate. The linear motor or actuator moves which, in turn, moves plungers coupled to struts, via a magnetic field produced by a stator. The actuator has a ring of permanent magnets that latches the clutch into two states, ON and OFF. Power is only consumed during the transition from one state to the other. Once in the desired state, the magnet latches and power is cut.

U.S. patent documents 2015/0000442; 2016/0047439; and U.S. Pat. No. 9,441,708 disclose 3-position, linear motor, magnetically-latching, 2-way CMDs.

Mechanical forces that are due to local or distant magnetic sources, i.e. electric currents and/or permanent magnet (PM) materials, can be determined by examination of the magnetic fields produced or "excited" by the magnetic sources. A magnetic field is a vector field indicating at any point in space the magnitude and direction of the influential capability of the local or remote magnetic sources. The strength or magnitude of the magnetic field at a point within any region of interest is dependent on the strength, the amount and the relative location of the exciting magnetic sources and the magnetic properties of the various mediums between the locations of the exciting sources and the given region of interest. By magnetic properties one means material characteristics that determine "how easy" it is to, or "how low" a level of excitation is required to, "magnetize" a unit volume of the material, that is, to establish a certain level of magnetic field strength. In general, regions which contain iron material are much easier to "magnetize" in comparison to regions which contain air or plastic material.

Magnetic fields can be represented or described as three dimensional lines of force, which are closed curves that traverse throughout regions of space and within material structures. When magnetic "action" (production of measurable levels of mechanical force) takes place within a magnetic structure these lines of force are seen to couple or link the magnetic sources within the structure. Lines of magnetic force are coupled/linked to a current source if they encircle all or a portion of the current path in the structure. Force lines are coupled/linked to a PM source if they traverse the PM material, generally in the direction or the anti-direction of the permanent magnetization. Individual lines of force or field lines, which do not cross one another, exhibit levels of tensile stress at every point along the line extent, much like the tensile force in a stretched "rubber band," stretched into the shape of the closed field line curve. This is the primary method of force production across air gaps in a magnetic machine structure.

One can generally determine the direction of net force production in portions of a magnetic machine by examining plots of magnetic field lines within the structure. The more field lines (i.e. the more stretched rubber bands) in any one direction across an air gap separating machine elements, the more "pulling" force between machine elements in that given direction.

Metal injection molding (MIM) is a metalworking process where finely-powdered metal is mixed with a measured amount of binder material to comprise a 'feedstock' capable of being handled by plastic processing equipment through a process known as injection mold forming. The molding process allows complex parts to be shaped in a single operation and in high volume. End products are commonly component items used in various industries and applications. The nature of MIM feedstock flow is defined by a physics called rheology. Current equipment capability requires processing to stay limited to products that can be molded using typical volumes of 100 grams or less per "shot" into the mold. Rheology does allow this "shot" to be distributed into multiple cavities, thus becoming cost-effective for small, intricate, high-volume products which would otherwise be quite expensive to produce by alternate or classic methods. The variety of metals capable of implementation within MIM feedstock are referred to as powder metallurgy, and these contain the same alloying constituents found in industry standards for common and exotic metal applications. Subsequent conditioning operations are performed on the molded shape, where the binder material is removed and the metal particles are coalesced into the desired state for the metal alloy.

A multiple-ratio (i.e., step-ratio) automatic transmission in an automotive vehicle powertrain adjusts a gear ratio between a torque source and a driveshaft to meet drivability requirements under dynamically-changing driving conditions. Ratio changes are achieved by engaging a so-called "on-coming clutch" ("OCC") as a so-called "off-going clutch" ("OGC") is released. The clutches, which may be referred to as transmission friction elements or brakes, establish and disestablish power flow paths from an internal combustion engine to vehicle traction wheels. During acceleration of the vehicle, the overall speed ratio, which is the ratio of transmission input shaft speed to transmission output shaft speed, is reduced as vehicle speed increases for a given engine throttle settling. This is an up-shift.

In the case of a synchronous up-shift, the OCC engages to lower both the gear ratio (i.e., the overall speed ratio) and the torque ratio (the ratio of output torque to input torque). The synchronous up-shift event can be divided into three phases, which may be referred to as a preparatory phase, a torque phase, and an inertia phase. The torque phase is a time period when the OCC torque is controlled to decrease toward a non-significant level with an intention to disengage it. Simultaneously, during the torque phase, the OCC is controlled to increase from a non-significant level, thereby initiating the OCC engagement according to a conventional up-shift control.

The clutch engagement and disengagement timing results in a momentary activation of two torque flow paths through the gearing, thereby causing torque delivery to drop momentarily at the transmission output shaft. This condition, which can be referred to as a "torque hole," occurs before the OGC disengages. A vehicle occupant can perceive a large torque hole as an unpleasant shift shock. The preparatory phase is a time period prior to the torque phase. The inertia phase is a time period when the OGC starts to slip due to substantially reduced holding capacity, following the torque phase.

An automated manual transmission (AMT), a type of automatic shifting transmission used in motor vehicles, improves mechanical efficiency by removing the torque converter. Such automated manual transmissions typically include a plurality of power-operated actuators that are controlled by a transmission controller or some type of electronic control unit (ECU) to automatically shift synchronized clutches that control the engagement of meshed gear wheels, traditionally found in manual transmissions. During a shift of an AMT, the engine torque is disconnected from the vehicle via a clutch. The torque is interrupted while the transmission changes ratio. After the ratio is changed, the clutch reapplies connecting the engine back to the drivetrain. The problem with this approach is that during the torque interruption, the driver is lunged forward in the cab and then lunged backwards when the engine hooks back up with the drivetrain. This shift event can be as long as a second. It is an undesirable "shift feel". Also the vehicle has no acceleration during this transition leading to undesirable driving situations (pulling out into traffic, merging, etc.).

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch" and "brake" may be used interchangeably.

SUMMARY OF EXAMPLE EMBODIMENTS

An object of at least one embodiment of the invention is to provide a switchable linear actuator device and an over-running, non-friction, radial coupling and control assembly both of which utilize a plurality of magnetic sources to move a translator structure to perform a sequenced shift.

In carrying out the above object and other objects of at least one embodiment of the invention, a switchable linear actuator device to control the operating mode of a non-friction coupling assembly is provided. The device has a plurality of magnetic sources which produce corresponding magnetic fields to create a plurality of net translational forces. The device includes a first locking member pivotable between an uncoupling position and a coupling position characterized by abutting engagement with a first load bearing shoulder of the coupling assembly. A second locking member is pivotable between an uncoupling position and a coupling position characterized by abutting engagement with a second load bearing shoulder of the coupling assembly. A stator structure includes a first electromagnetic source configured to create a first electronically-switched magnetic field and a second electromagnetic source configured to create a second electronically-switched magnetic field. A translator structure includes a first cam having a contour surface, a second cam having a contour surface and a magnetically-latching, permanent magnetic source magnetically coupled to the stator structure across a radial air gap. The translator structure is supported for translational movement relative to the stator structure along an axis between a plurality of predefined, discrete, axial positions which correspond to different operating modes of the coupling assembly. The translator structure translates along the axis between first and second axial positions upon experiencing a first net translational force to cause the first locking member to ride on the contour surface of the first cam to cause the first locking member to pivot between its coupling and uncoupling positions which correspond to different operating modes of the coupling assembly. The translator structure translates along the axis between the second axial position and a third axial position upon experiencing a second net translational force to cause the second locking member to ride on the contour surface of the second cam to cause the second locking member to pivot between its coupling and uncoupling positions which correspond to different operating modes of the coupling assembly. The first net translational force comprises a first translational force caused by energization of the first electromagnetic source and a magnetic latching force based on linear position of the permanent magnet source along the axis. The second net translational force comprises a second translational force caused by energization of the second electromagnetic source and a magnetic latching force based on a linear position of the permanent magnet source along the axis.

The first locking member may comprise a forward locking member.

The second locking member may comprise a reverse or coast locking member.

The first axial position may be a full "off" position, the third axial position may be a full "on" position and the second axial position may be an axial position intermediate the full "on" and the full "off" positions.

The translator structure may include a bi-directionally movable first plunger which supports the first cam to move therewith and a bi-directionally movable second plunger which supports the second cam to move therewith.

The coupling assembly may be a radial clutch assembly. Each of the cams may be funnel-shaped.

Further in carrying out the above object and other objects of at least one embodiment of the invention, a switchable linear actuator device to control the operating mode of first and second non-friction coupling assemblies is provided. The device has a plurality of magnetic sources which produce corresponding magnetic fields to create a plurality of net translational forces. The device includes a first locking member pivotable between an uncoupling position and a coupling position characterized by abutting engagement with a first load bearing shoulder of the first coupling assembly. A second locking member is pivotable between an uncoupling position and a coupling position characterized by abutting engagement with a second load bearing shoulder of the first coupling assembly. A third locking member is pivotable between an uncoupling position and a coupling position characterized by abutting engagement with a first load bearing shoulder of the second coupling assembly. A stator structure includes a first electromagnetic source configured to create a first electronically switched magnetic field, a second electromagnetic source configured to create a second electronically switched magnetic field and a third electromagnetic source configured to create a third electronically switch magnetic field. A translator structure includes a first cam having a contour surface, a second cam having a contour surface, a third cam having a contour surface and a magnetically-latching, permanent magnetic source magnetically coupled to the stator structure across a radial air gap. The translator structure is supported for translational movement relative to the stator structure in first and second opposite directions along an axis between a plurality of predefined, discrete, axial positions which correspond to different operating modes of the coupling assemblies. The translator structure translates along the axis in the first direction between first and second axial positions upon experiencing a first net translational force to cause the first locking member to ride on the contour surface of the first cam to cause the first locking member to pivot between its coupling and uncoupling positions, which correspond to different operating modes of the first coupling assembly. The translator structure translates in the first direction along the axis between the second axial position and a third axial position upon experiencing a second net translational force to cause the second locking member to ride on the contour surface of the second cam to cause the second locking member to pivot between its coupling and uncoupling positions which correspond to different operating modes of the first coupling assembly. The translator structure translates along the axis in the second direction between the first axial position and a fourth axial position upon experiencing a third net translational force to cause the third locking member to ride on the contour surface of the third cam to cause the third locking member to pivot between its coupling and uncoupling positions which correspond to different operating modes of the second coupling assembly. The third net translational force comprises a third translational force caused by energization of the third electromagnetic source and a magnetic latch force based on linear position of the permanent magnet source along the axis. The first net translational force comprises a first translational force caused by energization of the first electromagnetic source and a magnetic latching force based on linear position of the permanent magnet source along the axis. The second net translational force comprises a second translational force caused by energization of the second electromagnetic source and a magnetic latching force based on a linear position of the permanent magnet source along the axis.

The first and third locking members may comprise forward locking members.

The second locking member may comprise a reverse or coast locking member.

The first axial position may be a full "off" position, the third axial position may be a full "on" position, the second axial position may be an axial position intermediate the full "on" and the full "off" positions and the fourth axial position may be a full "on" position.

The translator structure may include a bi-directionally movable first plunger which supports the first and third cams to move therewith and a bi-directionally movable second plunger which supports the second cam to move therewith.

The coupling assembly may be a radial clutch assembly.

Each of the cams may be funnel-shaped.

Still further in carrying out the above object and other objects of at least one embodiment of the invention, an overrunning, non-friction, radial coupling and control assembly is provided. The assembly includes a non-friction coupling assembly having a pair of coupling members supported for rotation relative to one another about a common rotational axis. A switchable linear actuator device controls the operating mode of the coupling assembly. The device has a plurality of magnetic sources which produce corresponding magnetic fields to create a plurality of net translational forces. The device includes a first locking member pivotable between an uncoupling position and a coupling position characterized by abutting engagement with a first load bearing shoulder of the coupling assembly. A second locking member is pivotable between an uncoupling position and a coupling position characterized by abutting engagement with a second load bearing shoulder of the coupling assembly. The first and second locking members selectively mechanically couple the coupling members together to prevent relative rotation of the coupling members with respect to each other in first and second opposite directions, respectively, about the axis. A stator structure includes a first electromagnetic source configured to create a first electronically switched magnetic field and a second electromagnetic source configured to create a second electronically switched magnetic field. A translator structure includes a first cam having a contour surface, a second cam having a contour surface and a magnetically-latching, permanent magnetic source magnetically coupled to the stator structure across a radial air gap. The translator structure is supported for translational movement relative to the stator structure along the axis between a plurality of predefined, discrete, axial positions which correspond to different operating modes of the coupling assembly. The translator structure translates along the axis between first and second axial positions upon experiencing a first net translational force to cause the first locking member to ride on the contour surface of the first cam to cause the first locking member to pivot between its coupling and uncoupling positions which correspond to different operating modes of the coupling assembly. The translator structure translates along the axis between the second axial position and a third axial position upon experiencing a second net translational force to cause the second locking member to ride on the contour surface of the second cam to cause the second locking member to pivot between its coupling and uncoupling positions which correspond to different operating modes of the coupling assembly. The first net translational force comprises a first translational force caused by energization of the first electromagnetic source and a magnetic latching force based on linear position of the permanent magnet source along the axis. The second net translational force comprises a second translational force caused by energization of the second electromagnetic source and a magnetic latching force based on a linear position of the permanent magnet source along the axis.

The first locking member may comprise a forward locking member.

The second locking member may comprise a reverse or coast locking member.

The first axial position may be a full "off" position, the third axial position may be a full "on" position and the second axial position may be an axial position intermediate the full "on" and the full "off" positions.

The translator structure may include a bi-directionally movable first plunger which supports the first cam to move therewith and a bi-directionally movable second plunger which supports the second cam to move therewith.

Each of the cams may be funnel-shaped.

Other technical advantages will be readily apparent to one skilled in the art from the following figures, descriptions and claims. Moreover, while specific advantages have been enumerated, various embodiments may include all, some or none of the enumerated advantages.

DETAILED DESCRIPTION

Figure 1:
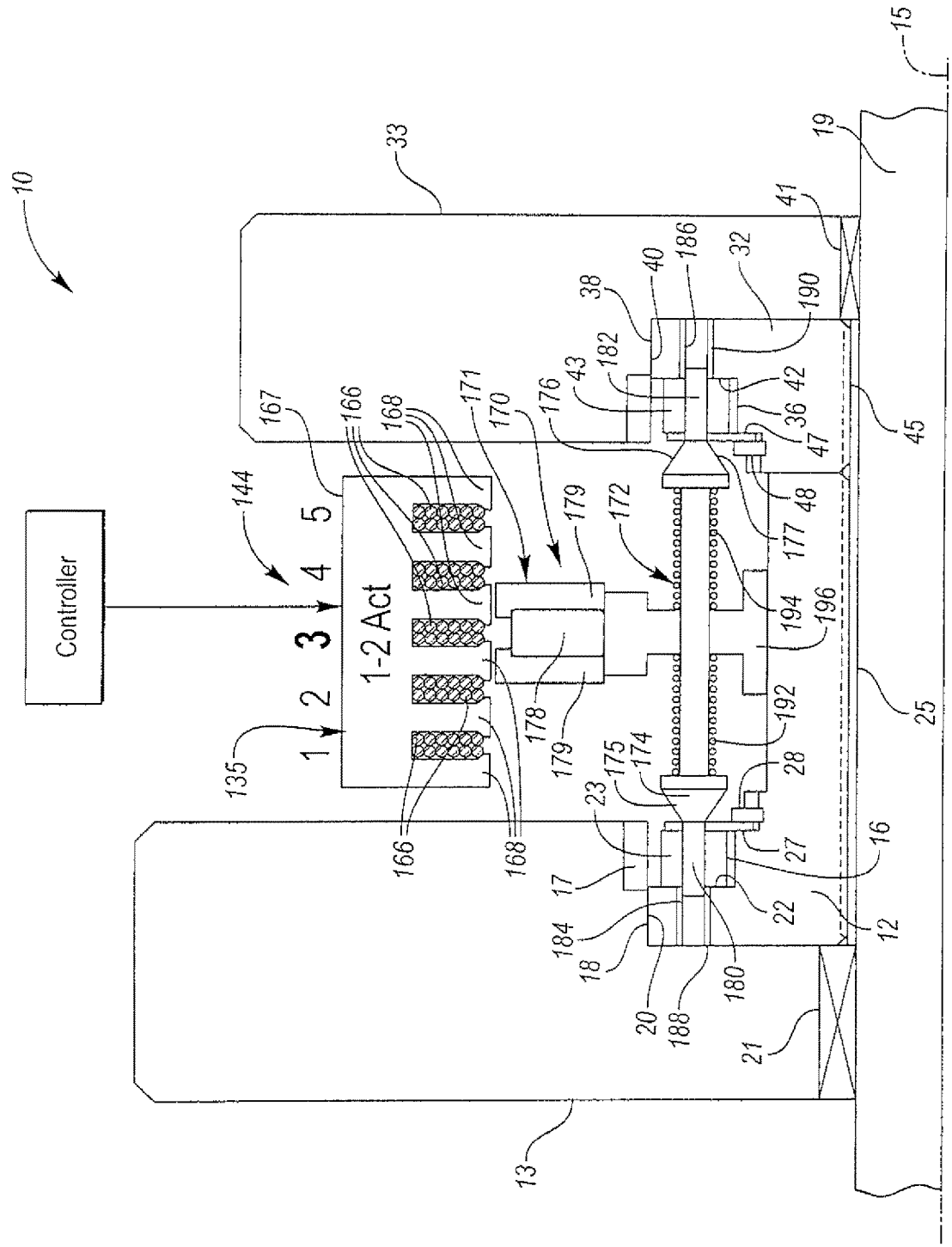
FIG. 1 is a side schematic view, partially broken away and in cross section, of a switchable linear actuator device including a forward plunger in its full "off" axial position (or position #3) and a radial coupling and control assembly which utilizes the device constructed in accordance with one embodiment of the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

An overrunning, non-friction, radial coupling and control assembly constructed in accordance with at least one embodiment of the present invention is generally indicated at 10 in FIGS. 1, 2, 4, 5, 7 and 8. The assembly 10 preferably includes one or more radial, pawl-type clutch assemblies having bearing support.

The assembly 10 includes a first pair of coupling members 12 and 13. The member 12 is a pocket plate and the member 13 comprises a notch plate which is typically integrated with a powdered metal gear (not shown) which may be mounted for rotation with a shaft (also not shown). The pocket plate has pockets 16 and the notch plate has notches 17. The members 12 and 13 are supported for rotation relative to one another about a common rotational axis 15 of an output shaft 19. The member 13 is supported for rotation on the shaft 19 by bearing 21. The coupling member 12 is splined to the output shaft 19 via splines 25 for rotation therewith.

First locking members or pawls 23 (both forward and reverse) float freely in their pockets 16 and selectively mechanically couple the first pair of members 12 and 13 together upon engaging notches 17 to prevent relative rotation of the first pair of members 12 and 13 with respect to each other in at least one direction about the axis 15.

The assembly 10 also includes a second pair of coupling members 32 and 33 supported for rotation relative to one another about the common rotational axis 15 and second locking members or pawls 43 which float freely in their pockets 36 for selectively mechanically coupling the second pair of members 32 and 33 together to prevent relative rotation of the second pair of members 32 and 33 with respect to each other in at least one direction about the axis 15. A powdered metal second gear (not shown) is typically integrally formed with the member 33 and is mounted for rotation with the shaft (not shown). The member 33 is supported for rotation on the shaft 19 by bearings 41. The coupling member 32 is splined to the output shaft 19 via splines 45 for rotation therewith.

The inner plate-like members 12 and 32 have outer peripheral surfaces 18 and 38, respectively. The outer plate-like members 13 and 33 have inner peripheral surfaces 20 and 40 adjacent the outer peripheral surface 18 and 38, respectively, in radially inner and radially outer relationship. Each of the members 12 and 32 includes the pockets 16 and 36, respectively, angularly spaced about the axis 15. Each of the pockets 16 and 36 has a closed end 22 and 42, respectively, and an open end located axially opposite its closed end 22 or 42.

Each of the pawls 23 and 43 is located in its respective pocket 16 or 36 and is supported to pivot toward the inner peripheral surface 20 or 40 of its member 13 or 33. The pawls 23 and 43 are retained within their respective pockets 16 and 36 by plate-like bushings or retainers 27 and 47 which are secured to their respective member 12 or 32 via locking or snap rings 28 and 48. The retainers 27 and 47 partially cover the open ends of the pockets 16 and 36, respectively.

The inner and outer peripheral surfaces 20 and 18, respectively, define a first radial bearing interface adjacent the closed end 22 of each of the pockets 16. The retainer 27 has a bearing surface which defines a bearing interface adjacent the open end of each of the pockets 16.

The inner and outer peripheral surfaces 40 and 38, respectively, define a second radial bearing interface adjacent the closed end 42 of each of the pockets 36. The retainer 47 has a bearing surface which defines a bearing interface adjacent the open end of each of the pockets 36.

Figure 3:
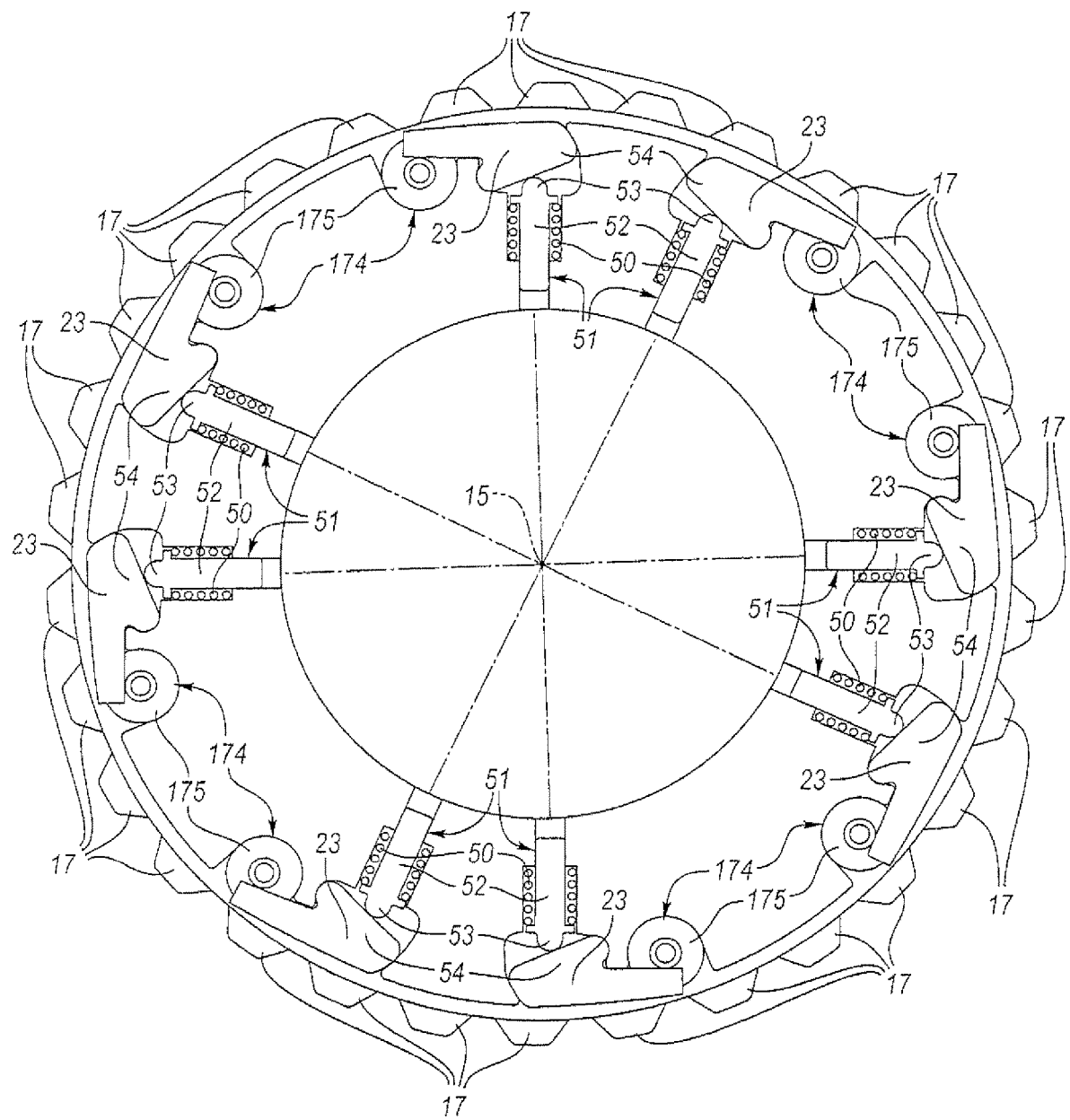
FIG. 3 is an end schematic view of a subassembly of the assembly of FIGS. 1 and 2 and showing forward and reverse or coast locking members in their uncoupling positions which corresponds to the device being in its full "off" position.
Figure 6:
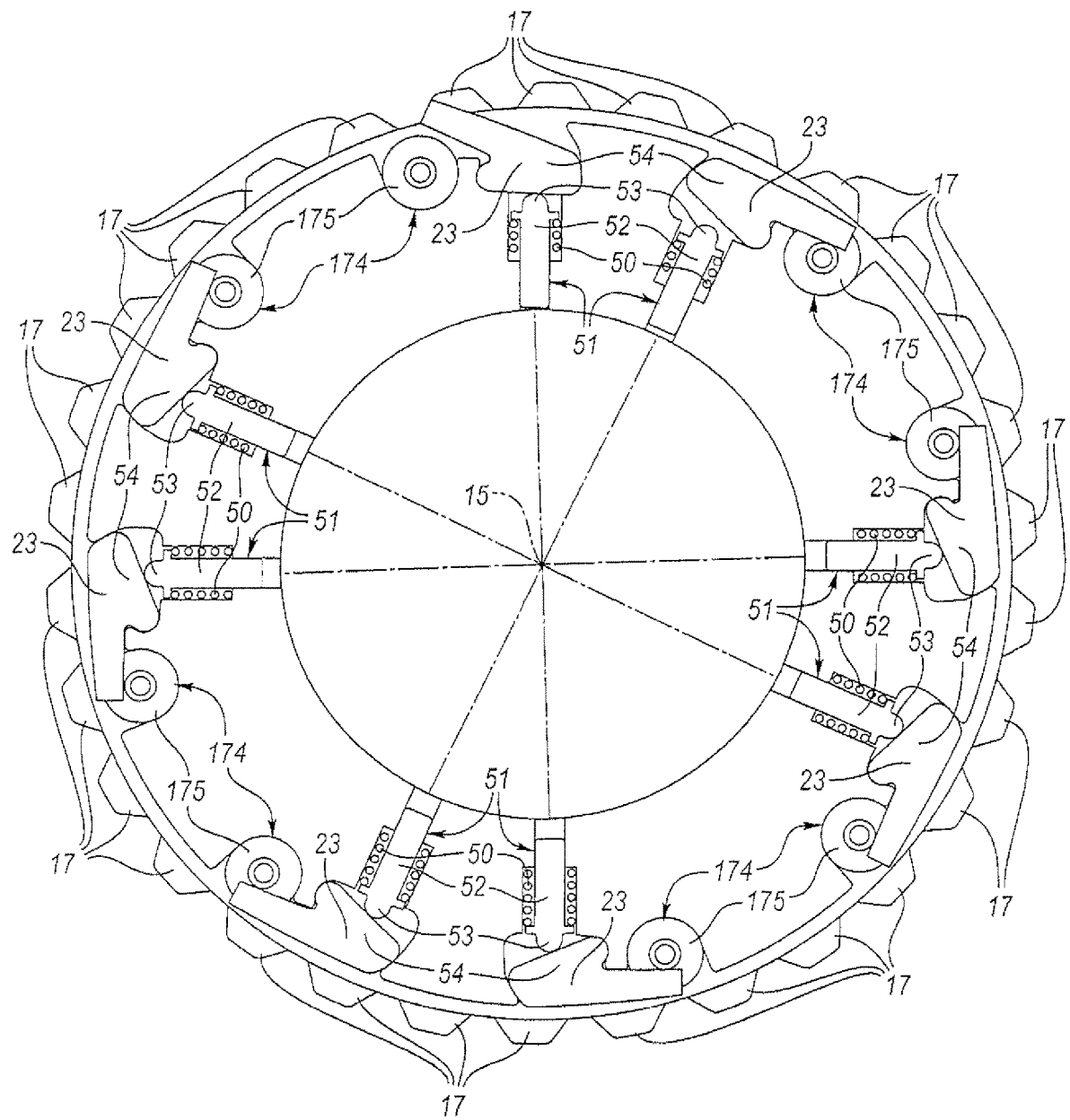
FIG. 6 is a view similar to the view of FIG. 3 and showing a forward locking member in its coupling position and a reverse or coast locking member in its uncoupling position which corresponds to the device being in its intermediate axial position.
Figure 9:
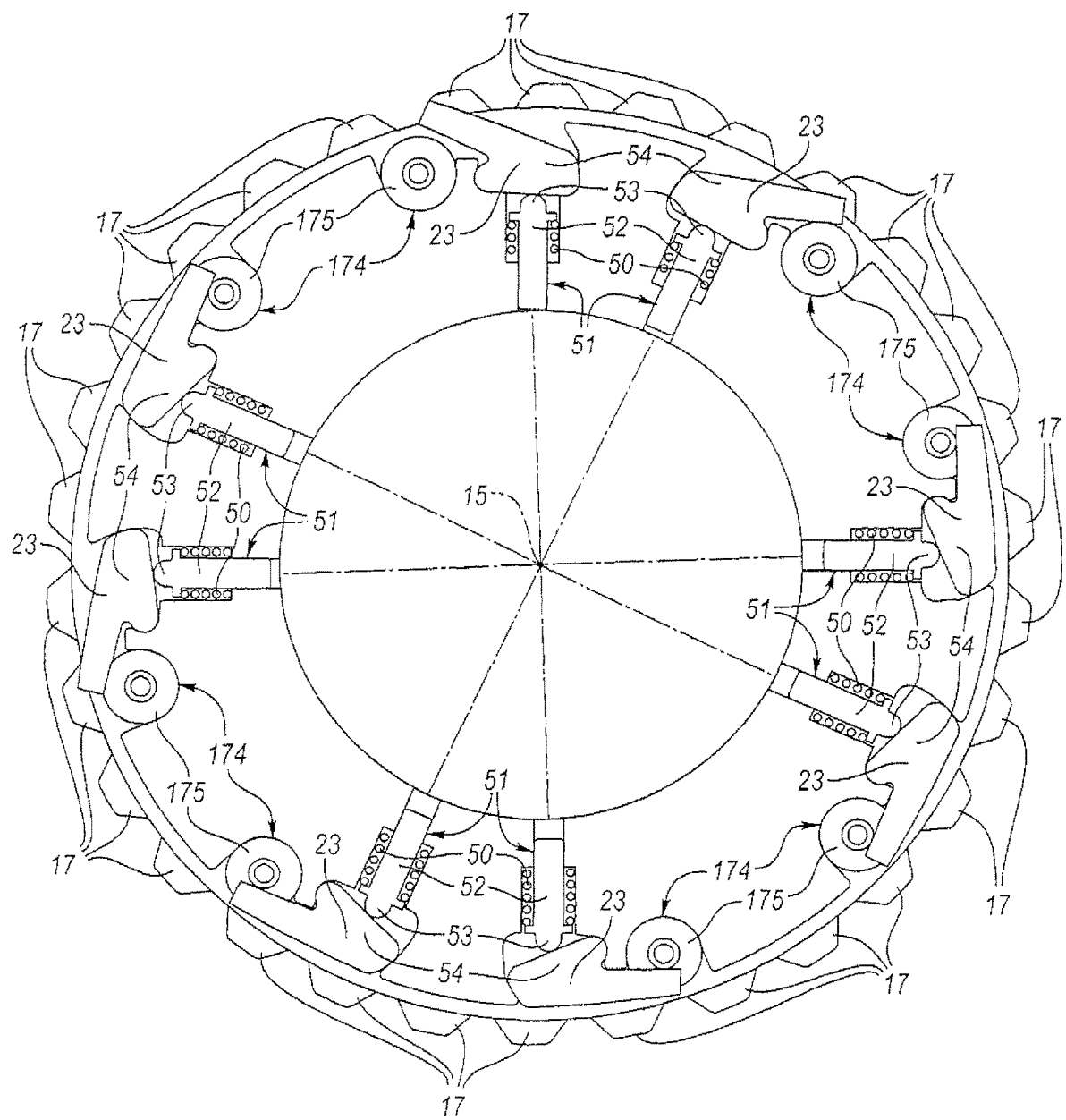
FIG. 9 is a view similar to the views of FIGS. 3 and 6 showing the forward and reverse locking members in their coupling positions which corresponds to the device being in its full "on" position.

As best shown in FIGS. 3, 6 and 9, the assembly 10 includes sets of actuators, generally indicated at 51, including biasing members, such as springs 50. Each actuator 51 includes a sliding pin 52 having a head 53 received within an aperture formed in the lower surface of an end portion 54 of its respective pawl 23. An opposite end portion 55 of each pawl 23 is configured to engage the notches 17. Each of the biasing members 50 urges its respective pin 52 to move its respective pawl 23 toward the peripheral surface 20 of the member 13.

Referring again to FIGS. 1, 2, 4, 5, 7 and 8, the assembly 10 also includes a 5-position linear stepper motor, generally indicated at 144. The stepper motor 144 is typically controlled by a controller and includes the stator structure or subassembly 135 including at least one coil 166 (five shown) to create an electromagnetically switched magnetic field and to create a magnetic flux when the at least one coil 166 is energized.

Figure 4:
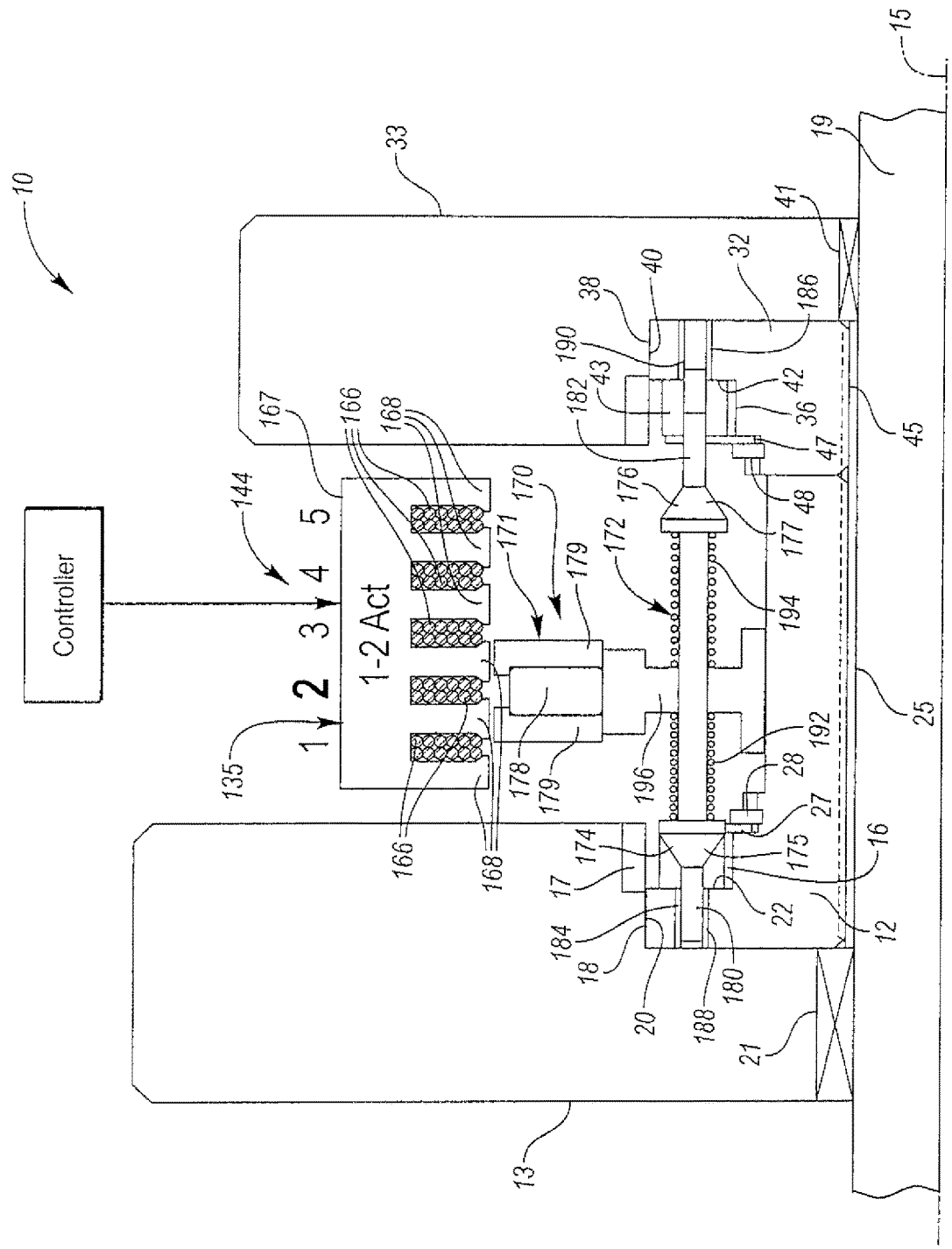
FIG. 4 is a view similar to the view of FIG. 1 with a translater structure of the device in an intermediate axial position between, its full "off" position and a full "on" position.
Figure 5:
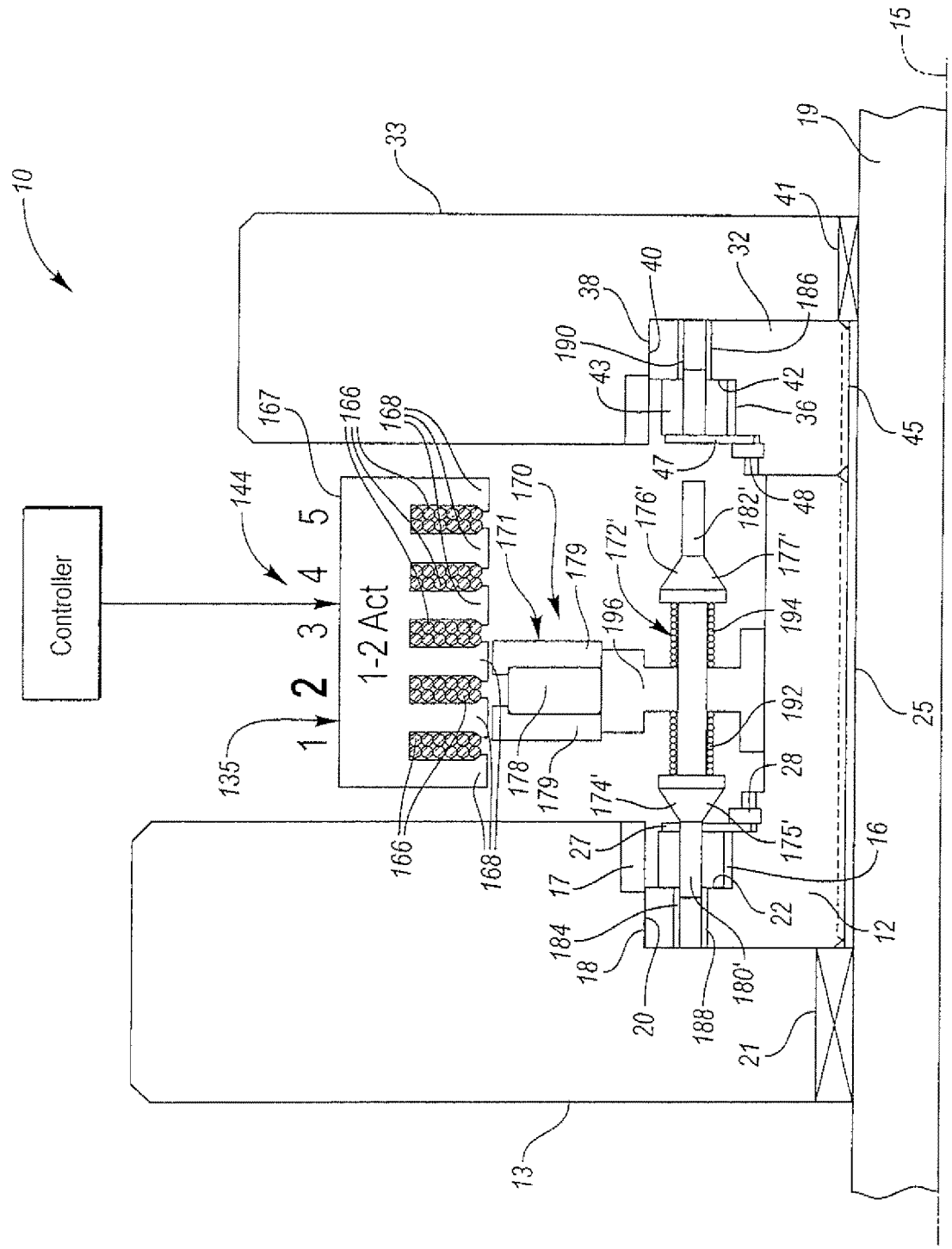
FIG. 5 is a view similar to the view of FIG. 4 but showing the coast plunger and not the forward plunger of FIG. 4.
Figure 7:
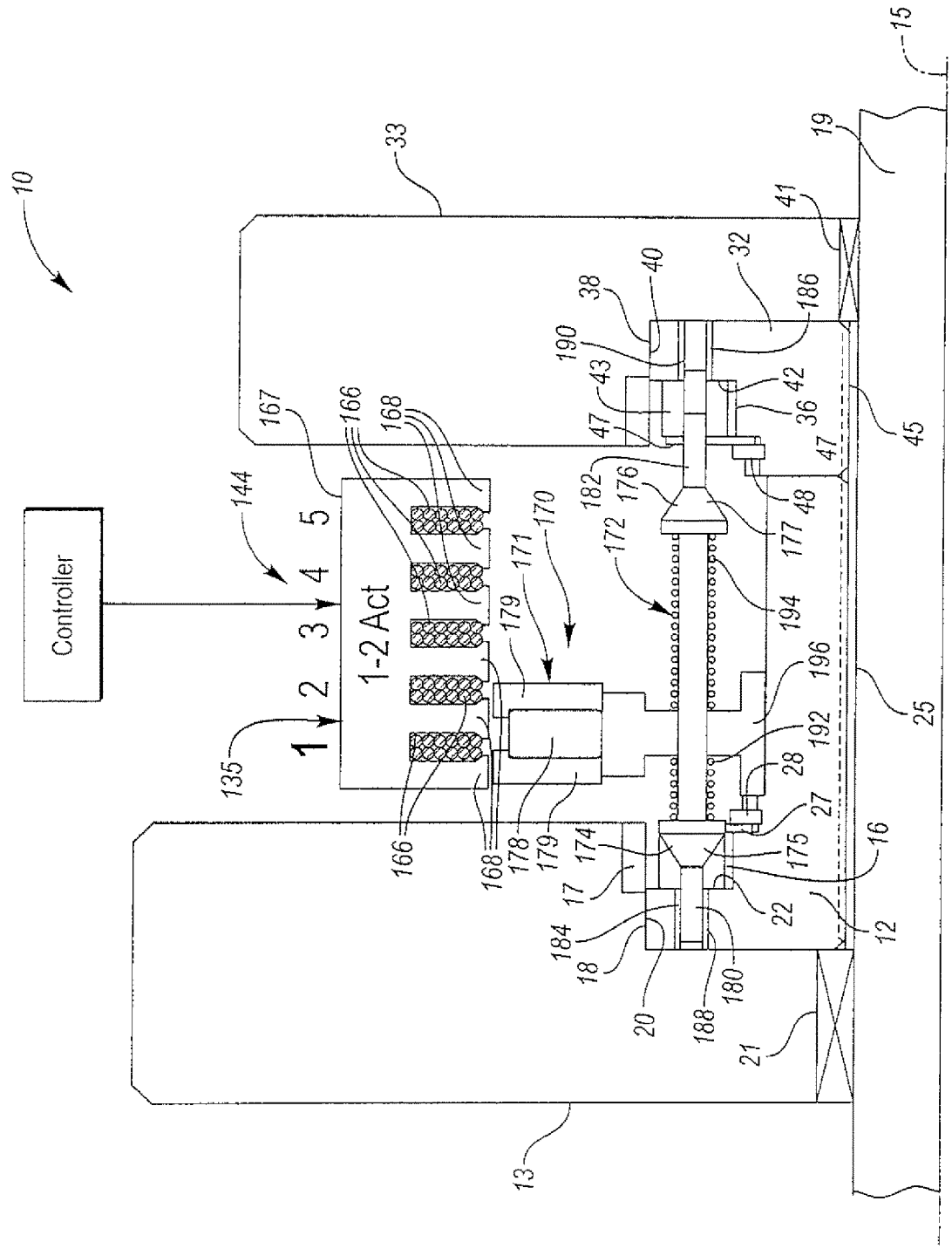
FIG. 7 is a view similar to the views of FIGS. 1 and 4 with the translater structure of the device in its full "on" axial position.
Figure 8:
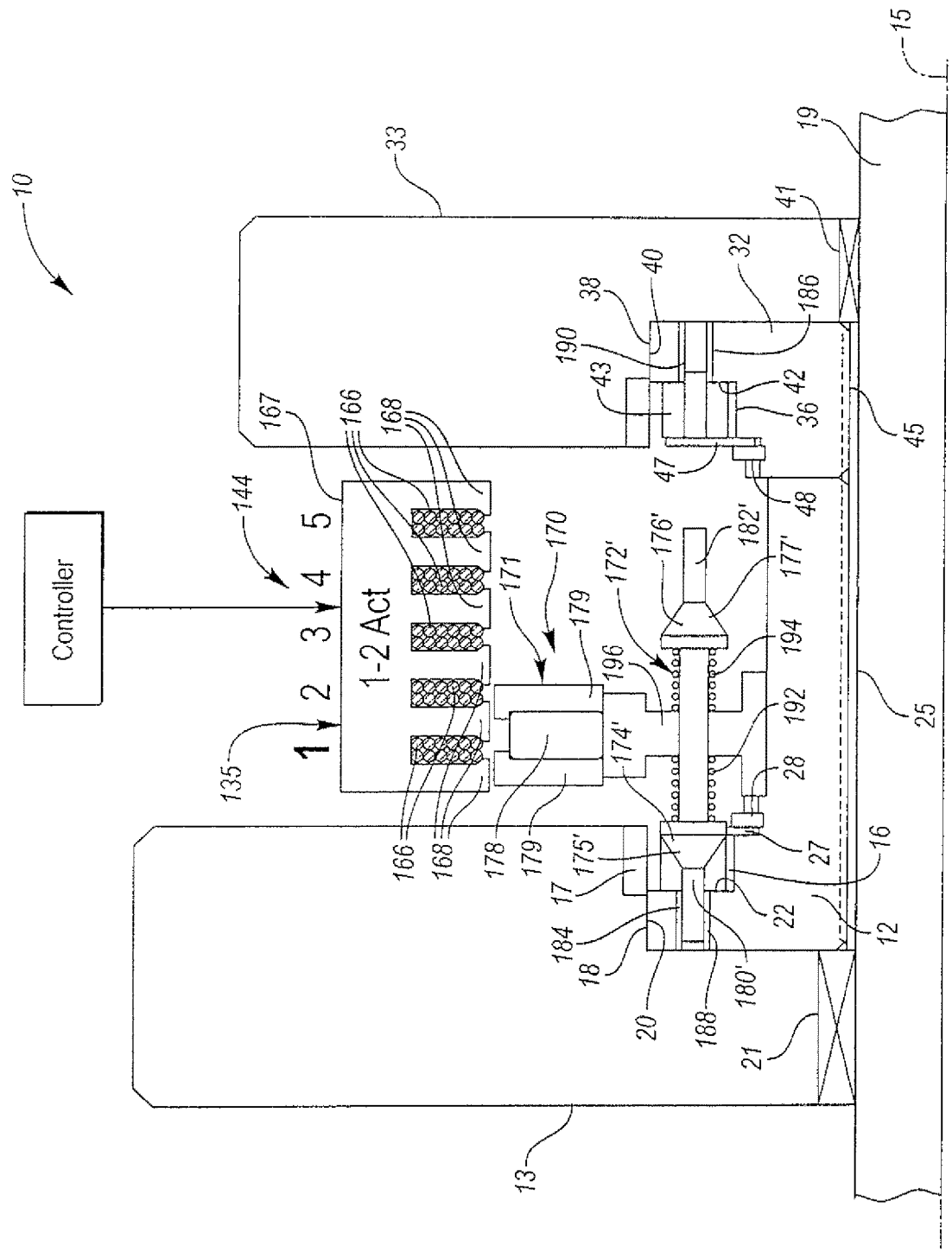
FIG. 8 is a view similar to the view of FIG. 7 but showing the coast plunger and not the forward plunger of FIG. 7.

The stepper motor 144 further includes a magnetically-latching translator structure or actuator subassembly, generally indicated at 170, including at least one bi-directionally movable connecting structure, such as a spring-biased forward rod or plunger, generally indicated at 172 in FIGS. 1, 4 and 7. A similar spring-biased coast plunger is generally indicated as 172' in FIGS. 2, 5 and 8. The plunger 172' is substantially identical to the plunger 172. Consequently, the parts of plunger 172' have the same reference number as the parts of the plunger 172, but a prime designation. Each rod 172 (or 172') includes a pair of spaced apart, funnel-shaped cams 174 and 176, each of which has a contour surface 175 and 177, respectively, to cause the first and second locking members 23 and 43, respectively, to ride on their respective contour surfaces 175 and 177 to cause small-displacement, locking-member pivotal movement between coupling and uncoupling positions generally as shown in FIGS. 6 and 9.

The actuator subassembly 170 further includes a magnetic actuator, generally indicated at 171, coupled to each rod 172 (or 172') and mounted for controlled reciprocating movement along the rotational axis 15 relative to the first and second pairs of coupling members 12 and 13, and 32 and 33, respectively, between a first extended position (corresponds to position #1) which corresponds to a first mode of the first pair of coupling members 12 and 13 and a second extended position (corresponds to position #5) which corresponds to a second mode of the second pair of coupling members 32 and 33. The cam 174 actuates the first locking member 23 in its extended position, so that the first locking member 23 couples the first pair of coupling members 12 and 13 for rotation with each other in at least one direction about the rotational axis 15.

Figure 2:
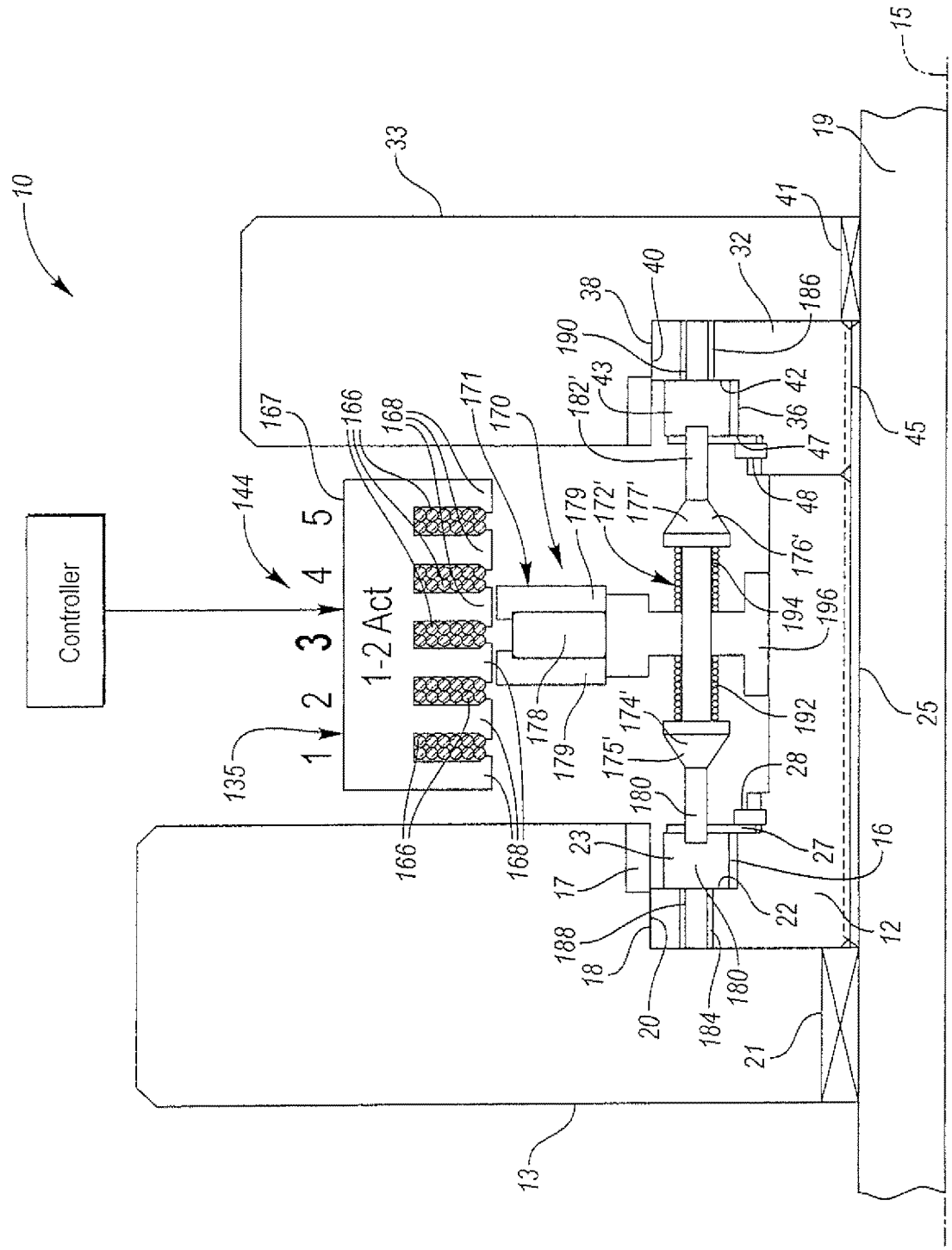
FIG. 2 is a view similar to the view of FIG. 1 but showing a coast plunger rather than the forward plunger of FIG. 1.

Position #3 is a neutral position in which both the forward and reverse or coast rockers are in their "off" positions as shown in FIGS. 1-3. Position #2 is an intermediate position between the neutral position of FIGS. 1-3 and position #1 of FIGS. 7-9. In position #2, the forward rockers are "on" and the coast rockers are "off" as shown in FIG. 6. In position #1, the forward rockers are "on" and the coast rockers are "on" as shown in FIG. 9.

The cam 176 actuates the second locking member 43 to couple the second pair of coupling members 32 and 33 for rotation with each other in at least one direction about the rotational axis 15. The magnetic actuator 171 completes a path of the magnetic flux to magnetically latch in the extended positions (i.e. positions 1, 2, 4 and 5). A control force caused by the magnetic flux is applied to linearly move the magnetic actuator 171 between the extended positions along the rotational axis 15.

The magnetic actuator 171 preferably includes a permanent magnet source 178 sandwiched between a pair of annular field redirection rings 179. The magnetic source 178 is preferably an annular, rare earth magnet which is axially magnetized.

In other words, the electromechanical apparatus or motor 144 controls the operating mode of a pair of coupling apparatus, each of which has drive and driven members supported for rotation relative to one another about the common rotational axis 15 of the output shaft 19. Each driven member may be the pocket plate 12 or 32 and the drive member may be the notch plate 13 or 33. Each coupling apparatus or assembly may include two or more rockers or pawls 23 or 43 for selectively mechanically coupling the members of each coupling assembly together and change the operating mode of each coupling assembly. Preferably, the rockers or pawls 23 and 43 are spaced at intervals about the axis 15 (i.e. FIGS. 3, 6 and 9).

The actuator subassembly 170 is configured or adapted for coupling with the members or plates of both of the coupling apparatus to rotate therewith. The subassembly 170 is supported on the output shaft 19 for rotation relative to the coils 166 about the rotational axis 15. The subassembly 170 typically includes two or more bi-directionally movable rods or shafts 172. Each stem portion 180 or 182 of its funnel-shaped cam 174 and 176, respectively, is adapted to slide within an aperture 184 or 186 in its respective coupling member during the selective, small-displacement, locking member pivotal movement. A bushing 188 or 190 may slidably support the stem portions 180 or 182, respectively, within the apertures 184 and 186.

The actuator 171 is operatively connected to the rods 172 for selective bi-directional shifting movement along the rotational axis 15 between a first position (i.e. position #1) of the actuator 171 which corresponds to a mode of the first coupling apparatus (plate 12 and plate 13) and a second position (i.e. position #5) of the actuator 171 which corresponds to a different mode of the coupling apparatus (plate 32 and plate 33). Two or more rods 172 may be spaced apart from one another as shown in FIGS. 3, 6 and 9. The different modes may be locked and unlocked (i.e. free wheeling) modes and may lock in one or both directions of rotary movement about the axis 15.

A first magnetic control force is applied to the actuator 171 when the at least one coil 166 is energized to cause the actuator 171 to move between its first, second, third (i.e. neutral), fourth and fifth positions along the axis 15.

The actuator 171 includes a pair of spaced biasing spring members 192 and 194 for each rod 172 for exerting corresponding biasing forces on an I-shaped hub or support 196 in opposite directions along the axis 15 when the hub 196 moves between its first, second, third, fourth and fifth positions along the axis 15. The hub 196 has holes for slideably receiving and supporting the connecting rods or shafts 172. When the support 196 moves, it pushes/pulls its respective springs 192 and 194 between opposite faces of the support 196 and cylindrical portions of the funnel-shaped cams 174 and 176.

The hub 196 rotates with the shaft 19 about the rotational axis 15. The hub 196 slideably supports interconnecting shaft portions of the shafts 172 during corresponding shifting movement along the rotational axis 15 via bushings mounted within the holes in the hub 196.

The member may include spaced stops to define the extended positions of the actuator 171.

The actuator 171 also preferably includes a set of spaced guide pins (not shown) sandwiched between inner surface of the member 12 and an outer surface of the hub 196 and extending along the rotational axis 15. The inner surface and the outer surface may have V-shaped grooves or notches (not shown) formed therein to hold the guide pins. The hub 196 slides on the guide pins during shifting movement of the hub 196 along the rotational axis 15. The guide pins pilot the hub 196 on the member 12. The hub 196 may also distribute oil to the guide pins.

The stator subassembly 135 includes a ferromagnetic housing 167 having spaced apart fingers 168 and the electromagnetically inductive coils 166 housed between adjacent fingers 168.

The actuator 171 is an annular part having the magnetic annular ring 178 sandwiched between the pair of ferromagnetic backing rings 179. The magnetic control forces magnetically bias the fingers 168 and their corresponding backing rings 179 into alignment upon coil energization. These forces latch the actuator 171 in the two "on" or extended positions, two "intermediate" positions and the "off" or neutral position. The rings 179 are acted upon by the stator subassembly 135 to move the actuator 171.

Axial Translation Latching Force in the Permanent Magnet (PM) Linear Motor (Taken from U.S. Published Application No. 2015/0014116)

Consider the magnetic field line plot, also referred to as a magnetic flux line plot, shown in the cross sectional view of the subject linear motor structure in FIG. 13 of U.S. published application No. 2015/0014116. This is a circularly symmetric machine structure, with the translator axial movement direction shown in the x-direction, and the radial direction shown in the y-direction. The stator 24,28 cross section is a three iron tooth 72, two slot/coil 26 structure with the slot openings facing, across a radial air gap, the moving element or translator. The translator structure includes a single, axially-magnetized, rare earth PM ring 78 sandwiched between two iron field redirection rings 80. The sizing of the various components can be estimated from the scaling, given in meters, on the x and y axes. The magnetic field lines have been determined by a commercial magnetic finite element analysis (MFEA) software package. The solution shown in FIG. 13 is for the case of no coil current in the stator windings, and a translator axial position somewhat past, to the right of, the "neutral" or center position. The magnetic field lines, due to the translator magnet ring 78 alone, are seen to "flow" in closed paths with the majority of the lines flowing in a stator iron-air gap-translator iron/magnet circular path.

In general, the lines of force are confined to paths with a majority of iron content due to the ease of field production within the iron material. Examining the field lines that cross the air gap between the stator and the translator, a majority of them follow a path, from the translator iron redirection rings, up and to the right, to the iron teeth members in the stator. Thinking of the field lines as stretched rubber bands one would then expect a net force pulling the entire translator to the right. The actual sheer force density or x-directed sheer stress, again determined from MFEA analysis, at the axial directed mid-air gap line for this case is given in FIG.

14A of the above-noted published application. Shearing stress to both the right and the left is seen in FIG. 14A, which can be matched to the distribution of air gap field lines which "lean" to both the right and left along the air gap, but the total force (the integrated shear over the air gap x-directed extent) shows a net force on the translator to the right, for this particular translator position.

If one "sweeps" the translator position from left to right and recalculates the field lines at each position one can obtain a "slide show" of the magnetic field line production due to the translator position. When the translator structure is located to the left of the center or neutral position, the majority of the flux lines flow radially up and to the left of the translator position, so we expect a left directed force on the translator body. Conversely, as also shown in FIG. 13, when the translator structure is located to the right of the center position, the majority of flux line flow is radially up and to the right, so a right directed force on the translator body is expected. A plot of the actual total axial force on the translator body as a function of axial position, given in Newtons, is shown in FIG. 15A of the above-noted published application. If the translator is positioned to the right of center, it is pushed, due to its own magnetic field, to the right, and if positioned to the left of center, it is pushed further to the left. This is referred to as the "latching" action of the assembly. The exact center position, where the left-right pushing force exactly balances to zero, is an unstable equilibrium point, at which even minute movements will result in forces tending to push the translator away from the center position. The two other points shown, near the two axial ends of the stator structure, where the net translational force also passes through a zero value, are stable equilibrium points, where minute movements result in position restoring force production.

Axial Translation Force in the Permanent Magnet Linear Motor for the Case of Coil Current (Taken from U.S. Published Application No. 2015/0014116)

Consider the same machine structure as given in FIG. 13 but with the addition of a steady electrical current in the two stator windings. The solution for the magnetic field lines for this situation is shown in FIG. 16 of the above-mentioned application. A steady current, assumed uniformly distributed in the winding cross sections, is assumed to flow out of the page, toward the viewer in the wires of the coil in the slot on right side of the stator. The axial magnetization direction of the ring magnet did not matter in the pure latching force situation of FIG. 13 but it matters very much in this case of "dual" magnetic excitation. For the case shown, the magnet axial magnetization is stipulated to be to the right, in the plus x-direction, and therefore the direction or polarity of the magnetic lines of force closed "flow" path, due to the magnet alone, would be a counter clockwise circulation. The polarity direction of the circulating magnetic lines of force due to an electric current is given by the "right hand rule." If the thumb of one's right hand is made to point in the direction of the current flow in a wire, or a coil of wires, with the fingers encircling the cross section of the wire or the coil, the magnetic field lines or flux lines also encircle the wire or coil cross section and have a circulating direction in the same direction as the curling fingers.

In FIG. 16 the magnetic lines due the current in the left side coil alone then encircle this coil in the counter clockwise direction, while the magnetic lines due to the current in the right side coil encircle this coil in the clockwise direction. The net or total production of magnetic field lines, as shown in FIG. 16 is due to all three magnetic sources, the current in both coils and the translator magnet, so obviously there are regions in the machine structure where the individual sources of magnetic excitation enforce and add with each other and there are regions in the machine structure where the individual sources of magnetic excitation buck or subtract from each other. Since the coil current is reversible (plus or minus) the dual source enforcement and bucking regions within the machine structure and, most importantly, within the machine air gap, can be removed with respect to each other. This is the basis of the controllable/reversible direction linear motor disclosed herein.

The flow of the majority of the flux lines produced by the translator magnet alone resulted in a net force on the translator to the right for the given translator position shown in FIG. 13. But for the same translator position, with the addition of the coil currents, for the case shown in FIG. 16, the flow of the majority of the flux lines has shifted to a net encirclement of the left hand coil and the translator structure. So the majority of the flux lines now cross the air gap up and to the left with respect to the case confirms this and is shown in the plot of FIG. 17A of the above-noted published application. If the translator, by means of a "stop" was, previous to the introduction to translator magnet, introduction of coil current as in FIG. 16 would then overpower the latching force to the right and produce a net motoring force to the left, inducing the translator into left-directed motion. If the translator does move and subsequently crosses over the center or neutral position, the motoring or switching current can even then be removed, as the now left-directed latching force, due to the magnet alone, will enforce the remaining left movement to a similar off-state latching position to the left of the center or neutral position. The net axial separation between the two latched positions on the left and right of the center position is then said to be the "stroke" length of the machine.

A slide show set of solutions for the total magnetic field lines within the linear motor structure with the same coil current drive as in the case shown in FIG. 16, as a function of the axial position of the translator, similar to that given for the previous case of magnet excitation alone, show that for the level of coil current assumed the net force on the translator structure is always to the left, no matter the assumed value of the translator position.

Finally, the magnetic field and axial sheer stress solutions for the case of coil current aiding drive, that is drive in the direction of the magnet latching force, are given in FIGS. 18 and 19A, respectively of the above-noted published application. The polarity of the coil currents for the case of FIGS. 18 and 19A are simply reversed from that of the case shown in FIGS. 16 and 17A, the translator position is the same as in the case of FIGS. 16 and 17A. In this case, coil current drives in the direction of the magnet latching force, when the translator position has moved to the left of the center position.

Each embodiment of a drive system or powertrain constructed in accordance with the invention may utilize a main controller or electronic control unit (not shown) and one or more controllers as shown by the controllers in FIGS. 1 and 14. The controllers are preferably controlled by the control unit.

In general, the control unit provides and regulates the power to drive the linear motor through one or more controllers. Each controller typically has a microcontroller (i.e. MCU) including circuitry. Each controller typically receives command signals from the remote electronic control unit over or through a vehicle-based bus.

Preferably, control logic used by the control unit and/or the controller is implemented primarily in software executed by a microprocessor-based controller or the microcontroller (i.e. MCU). Of course, the control logic may be implemented in software, hardware, or a combination of software and hardware depending upon the particular application. When implemented in software, the control logic is preferably provided in a computer-readable storage medium having stored data representing instructions executed by a computer. The computer-readable storage medium or media may be any of a number of known physical devices which utilize electric, magnetic, and/or optical devices to temporarily or persistently store executable instructions and associated calibration information, operating variables, and the like.

The control unit and the controller are connected via a vehicle bus such as a local interconnect network (LIN or CAN) line or bus capable of two-way communications. LIN is one of many possible in-vehicle local area network (LAN) communications protocols. A power line and a ground line may be provided between the control unit and the controller. Each controller typically includes a transceiver interface within the MCU, a microprocessor and its control logic within the MCU, and a motor drive or driver, and an electrical power source. Each controller may be integrated or physically coupled within the housing, while the control unit is provided some distance away from the housing.

The MCU of the motor controller typically includes a memory and may be configured as a conventional microcomputer including a CPU, a ROM, a RAM and the like or as a hardwired logic circuit.

Sequenced Shifting (OFF, FWD, Coast) is described above in at least one embodiment of the present invention.

The way that a shift works from the full "OFF" position to the full "ON" position is as follows:

1. The forward clutch is synced such that the forward rocker is in an over run state targeting 10 to 50 RPM
2. Once in this state, the linear motor is shifted from position 3 to position 2 (OFF to ON)
3. The e-motor(s) then land on the rocker locking and transmitting torque in the forward direction.
4. While the forward rocker is transmitting load, the coast rocker is synced and is turned ON.

The advantage of a 0-0 to a 1-0 to a 1-1 shift as opposed to a 0-0 to a 1-1 shift is better shift quality. The impact and NVH of a sequenced shift is negligible. A sequenced shift is more forgiving when syncing. A 0-0 to a 1-1 state is the same shift a dog-clutch executes and historically can be challenging due to the condition where the races of the clutch have to be synced (in a position) in order to be turned ON.

Sequenced Shifting (OFF, FWD, Coast) is described below with respect to Table 1.

Position 4 and 5 on the second clutch is the same as 2 and 1 on the first clutch.

TABLE 1

| Position | 1$^{st}$ Forward | 1$^{st}$ Coast | 2$^{nd}$ Forward | 2$^{nd}$ Coast |
|---|---|---|---|---|
| 1 | X | X | | |
| 2 | X | | | |
| 3 | | | | |
| 4 | | | X | |
| 5 | | | X | X |

A 4-position device is described by Table 2.

TABLE 2

| Position | 1$^{st}$ Forward | 1$^{st}$ Coast | 2$^{nd}$ Forward | 2$^{nd}$ Coast |
|---|---|---|---|---|
| 1 | X | X | | |
| 2 | X | | | |
| 3 | | | | |
| 4 | | | X | X |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A switchable linear actuator device to control the operating mode of a non-friction coupling assembly, the device having a plurality of magnetic sources which produce corresponding magnetic fields to create a plurality of net translational forces, the device comprising:

a first locking member pivotable between an uncoupling position and a coupling position characterized by abutting engagement with a first load bearing shoulder of the coupling assembly;

a second locking member pivotable between an uncoupling position and a coupling position characterized by abutting engagement with a second load bearing shoulder of the coupling assembly;

a stator structure including a first electromagnetic source configured to create a first electronically-switched magnetic field and a second electromagnetic source configured to create a second electronically-switched magnetic field; and a translator structure including a first cam having a contour surface, a second cam having a contour surface and a magnetically-latching, permanent magnetic source magnetically coupled to the stator structure across a radial air gap, the translator structure being supported for translational movement relative to the stator structure along an axis between a plurality of predefined, discrete, axial positions which correspond to first, second, and third operating modes of the coupling assembly, the translator structure translating along the axis in a first direction between first and second axial positions upon experiencing a first net translational force to cause the first locking member to ride on the contour surface of the first cam to cause the first locking member to pivot between its coupling and uncoupling positions which correspond to the first and the second operating modes of the coupling assembly, the translator structure translating along the axis in the first direction between the second axial position and a third axial position upon experiencing a second net translational force to cause the second locking member to ride on the contour surface of the second cam to cause the second locking member to pivot between its coupling and uncoupling positions which correspond to the second and the third operating modes of the coupling assembly, the first net translational force comprising a first translational force caused by energization of the first electromagnetic source and a first magnetic latching force based on a first linear position of the permanent magnet source along the axis and the second net translational force comprising a second translational force caused by energization of the second electromagnetic source and a second magnetic latching force based on a second linear position of the permanent magnet source along the axis.

2. The device as claimed in claim 1, wherein the first locking member is a forward locking member.

3. The device as claimed in claim 1, wherein the second locking member is either a reverse locking member or a coast locking member.

4. The device as claimed in claim 1, wherein the first axial position is a full "off" position in which the first locking member and the second locking member are in their uncoupling positions, the third axial position is a full "on" position in which the first locking member and the second locking member are in their coupling positions, and the second axial position is an axial position intermediate the full "on" and the full "off" positions in which the first locking member is in its coupling position and the second locking member is in its uncoupling position.

5. The device as claimed in claim 1, wherein the translator structure includes a bi-directionally movable first plunger which supports the first cam to move therewith and a bi-directionally movable second plunger which supports the second cam to move therewith.

6. The device as claimed in claim 1, wherein the coupling assembly is a radial clutch assembly.

7. The drive as claimed in claim 1, wherein each of the first and second cams are funnel-shaped.

8. A switchable linear actuator device to control the operating mode of first and second non-friction coupling assemblies, the device having a plurality of magnetic sources which produce corresponding magnetic fields to create a plurality of net translational forces, the device comprising:

a first locking member pivotable between an uncoupling position and a coupling position characterized by abutting engagement with a first load bearing shoulder of the first coupling assembly;

a second locking member pivotable between an uncoupling position and a coupling position characterized by abutting engagement with a second load bearing shoulder of the first coupling assembly;

a third locking member pivotable between an uncoupling position and a coupling position characterized by abutting engagement with a first load bearing shoulder of the second coupling assembly;

a stator structure including a first electromagnetic source configured to create a first electronically switched magnetic field, a second electromagnetic source configured to create a second electronically switched magnetic field and a third electromagnetic source configured to create a third electronically switch magnetic field; and a translator structure including a first cam having a contour surface, a second cam having a contour surface, a third cam having a contour surface and a magnetically-latching, permanent magnetic source magnetically coupled to the stator structure across a radial air gap, the translator structure being supported for translational movement relative to the stator structure in first and second opposite directions along an axis between a plurality of predefined, discrete, axial positions which correspond to different operating modes of the coupling assemblies, the translator structure translating along the axis in the first direction between first and second axial positions upon experiencing a first net translational force to cause the first locking member to ride on the contour surface of the first cam to cause the first locking member to pivot between its coupling and uncoupling positions which correspond to first and second operating modes of the first coupling assembly, the translator structure translating in the first direction along the axis between the second axial position and a third axial position upon experiencing a second net translational force to cause the second locking member to ride on the contour surface of the second cam to cause the second locking member to pivot between its coupling and uncoupling positions which correspond to second and third operating modes of the first coupling assembly, the translator structure translating along the axis in the second direction between the first axial position and a fourth axial position upon experiencing a third net translational force to cause the third locking member to ride on the contour surface of the third cam to cause the third locking member to pivot between its coupling and uncoupling positions which correspond to different operating modes of the second coupling assembly, the third net translational force comprising a third translational force caused by energization of the third electromagnetic source and a third magnetic latch force based on a third linear position of the permanent magnet source along the axis, the first net translational force comprising a first translational force caused by energization of the first electromagnetic source and a first magnetic latching force based on a first linear position of the permanent magnet source along the axis and the second net translational force comprising a second translational force caused by energization of the second electromagnetic source and a second magnetic latching force based on a second linear position of the permanent magnet source along the axis.

9. The device as claimed in claim 8, wherein the first and third locking members are forward locking members.

10. The device as claimed in claim 8, wherein the second locking member is either a reverse locking member or a coast locking member.

11. The device as claimed in claim 8, wherein the first axial position is a full "off" position, the third axial position is a full "on" position, the second axial position is an axial position intermediate the full "on" and the full "off" positions and the fourth axial position is a full "on" position.

12. The device as claimed in claim 8, wherein the translator structure includes a bi-directionally movable first plunger which supports the first and third cams to move therewith and a bi-directionally movable second plunger which supports the second cam to move therewith.

13. The device as claimed in claim 8, wherein the first and second coupling assemblies are radial clutch assemblies.

14. The drive as claimed in claim 8, wherein each of the first and second cams are funnel-shaped.

15. An overrunning, non-friction, radial coupling and control assembly comprising:

a non-friction coupling assembly including a pair of coupling members supported for rotation relative to one another about a common rotational axis; and a switchable linear actuator device to control the operating mode of the coupling assembly, the device having a plurality of magnetic sources which produce corresponding magnetic fields to create a plurality of net translational forces, the device comprising:

a first locking member pivotable between an uncoupling position and a coupling position characterized by abutting engagement with a first load bearing shoulder of the coupling assembly;

a second locking member pivotable between an uncoupling position and a coupling position characterized by abutting engagement with a second load bearing shoulder of the coupling assembly, the first and second locking members selectively mechanically coupling the coupling members together to prevent relative rotation of the coupling members with respect to each other in first and second opposite directions, respectively, about the axis;

a stator structure including a first electromagnetic source configured to create a first electronically switched magnetic field and a second electromagnetic source configured to create a second electronically switched magnetic field; and a translator structure including a first cam having a contour surface, a second cam having a contour surface and a magnetically-latching, permanent magnetic source magnetically coupled to the stator structure across a radial air gap, the translator structure being supported for translational movement relative to the stator structure along the axis between a plurality of predefined, discrete, axial positions which correspond to first, second, and third operating modes of the coupling assembly, the translator structure translating along the axis in a first direction between first and second axial positions upon experiencing a first net translational force to cause the first locking member to ride on the contour surface of the first cam to cause the first locking member to pivot between its coupling and uncoupling positions which correspond to the first and the second operating modes of the coupling assembly, the translator structure translating along the axis in the first direction between the second axial position and a third axial position upon experiencing a second net translational force to cause the second locking member to ride on the contour surface of the second cam to cause the second locking member to pivot between its coupling and uncoupling position which correspond to the second and the third operating modes of the coupling assembly, the first net translational force comprising a first translational force caused by energization of the first electromagnetic source and a first magnetic latching force based on a first linear position of the permanent magnet source along the axis and the second net translational force comprising a second translational force caused by energization of the second electromagnetic source and a second magnetic latching force based on a second linear position of the permanent magnet source along the axis.

16. The assembly as claimed in claim 15, wherein the first locking member is a forward locking member.

17. The assembly as claimed in claim 15, wherein the second locking member is either a reverse locking member or a coast locking member.

18. The device as claimed in claim 15, wherein the first axial position is a full "off" position in which the first locking member and the second locking member are in their uncoupling positions, the third axial position is a full "on" position in which the first locking member and the second locking member are in their coupling positions, and the second axial position is an axial position intermediate the full "on" and the full "off" positions in which the first locking member is in its coupling position and the second locking member is in its uncoupling position.

19. The assembly as claimed in claim 15, wherein the translator structure includes a bi-directionally movable first plunger which supports the first cam to move therewith and a bi-directionally movable second plunger which supports the second cam to move therewith.

20. The assembly as claimed in claim 15, wherein each of the first and second cams are funnel-shaped.

* * * * *